(12) United States Patent
Lee

(10) Patent No.: US 12,066,550 B2
(45) Date of Patent: Aug. 20, 2024

(54) METHOD AND APPARATUS FOR DISTRIBUTING OR PROVIDING RTK POSITIONING CORRECTION DATA USING VIRTUAL CELL

(71) Applicant: Sangjoo Lee, Seoul (KR)

(72) Inventor: Sangjoo Lee, Seoul (KR)

( * ) Notice: Subject to any disclaimer, the term of this patent is extended or adjusted under 35 U.S.C. 154(b) by 305 days.

(21) Appl. No.: 17/520,802

(22) Filed: Nov. 8, 2021

(65) Prior Publication Data

US 2022/0057523 A1    Feb. 24, 2022

Related U.S. Application Data

(63) Continuation of application No. PCT/KR2020/005986, filed on May 7, 2020.

(30) Foreign Application Priority Data

May 10, 2019   (KR) .......................... 10-2019-0054701

(51) Int. Cl.
*G01S 19/07* (2010.01)
*G01S 19/23* (2010.01)
*G01S 19/24* (2010.01)

(52) U.S. Cl.
CPC ............. *G01S 19/07* (2013.01); *G01S 19/23* (2013.01); *G01S 19/24* (2013.01)

(58) Field of Classification Search
CPC .......... G01S 19/07; G01S 19/04; G01S 19/23; G01S 19/24; G01S 19/40; G01S 19/06;
(Continued)

(56) References Cited

U.S. PATENT DOCUMENTS

| | | | |
|---|---|---|---|
| 2013/0234885 A1 | 9/2013 | Geier et al. | |
| 2015/0373626 A1* | 12/2015 | Yi | H04B 1/7143 375/132 |

(Continued)

FOREIGN PATENT DOCUMENTS

| | | |
|---|---|---|
| JP | 2003-052068 A | 2/2003 |
| KR | 10-2009-0039166 A | 4/2009 |

(Continued)

OTHER PUBLICATIONS

Search Report, mailed Sep. 1, 2020, for International Application No. PCT/KR2020/005986.
(Continued)

*Primary Examiner* — Hirdepal Singh
(74) *Attorney, Agent, or Firm* — LRK PATENT LAW FIRM

(57) ABSTRACT

A method for generating and distributing GNSS positioning correction data includes dividing a service area into plural virtual cells, locating a virtual RTK reference station in every virtual cell, collectively calculating interpolated correction data for virtual RTK reference stations using correction data of actual RTK reference stations, encoding any combination of correction data into a virtual cell RTK frame, and distributing or providing the virtual cell RTK frame to servers or user devices through networks. Cost-effectiveness of distribution (or service) network can be achieved by means of spatial and/or temporal optimization of correction data with a virtual cell map indicating validities of each virtual cell.

10 Claims, 6 Drawing Sheets

(58) Field of Classification Search
CPC ...... G01S 19/072; G01S 19/20; G01S 19/256; G01S 19/43
See application file for complete search history.

(56) References Cited

U.S. PATENT DOCUMENTS

2020/0341154 A1* 10/2020 Takac ................ G01S 19/41
2022/0350035 A1* 11/2022 Huang ............... G01S 19/04

FOREIGN PATENT DOCUMENTS

| KR | 10-2019-0043973 A | | 4/2019 |
|---|---|---|---|
| KR | 20190043973 A | * | 4/2019 |
| WO | 2018-121623 A1 | | 7/2018 |

OTHER PUBLICATIONS

Written Opinion, mailed Sep. 1, 2020, for International Application No. PCT/KR2020/005986.

* cited by examiner

METHOD AND APPARATUS FOR DISTRIBUTING OR PROVIDING RTK POSITIONING CORRECTION DATA USING VIRTUAL CELL

CROSS-REFERENCE TO RELATED APPLICATIONS

This application is a continuation of International Application No. PCT/KR2020/005986, filed on May 7, 2020, which claims priority to Korean Patent Application No. 10-2019-0054701, filed on May 10, 2019, the entire disclosure of which is incorporated herein by reference for all purposes.

BACKGROUND OF THE INVENTION

1. Field of the Invention

The present invention relates to the field of real-time precise positioning systems and methods using GNSS (Global Navigation Satellite System).

2. Description of Related Art

Positioning using GNSS satellite signals can be difficult to ensure accuracy level consistent with a high-level location-based service due to various errors included in the satellite signal. For this reason, various methods of providing correction data from ground reference stations for improving the accuracy of GNSS positioning have been proposed.

The types of correction data are largely divided into SSR (State Space Representation) and OSR (Observation Space Representation) methods. The SSR method separately analyzes and presents various errors that exist between the GNSS satellite and the GNSS antenna on the ground, and the receiver analyzes these individual errors and calculates the total error contained in the observed values of the received GNSS signal. The OSR method does not produce individual error components, but estimates the total observation error and delivers it to the GNSS receiver.

Recently, NRTK (Network-based Real Time Kinematic), which is classified as one of the OSR methods, can accurately measure the location of a moving object in real time and has been in the spotlight in terms of practicality. NRTK includes VRS (Virtual Reference System), FKP (Flachen Korrektur Parameter), and MAC (Master Auxiliary Concept) methods, and commercial products are on the market.

The OSR method has a disadvantage in that accuracy decreases as the distance between the ground reference station and the user device increases. Consequently, the OSR method requires a large number of ground reference stations in order to service a large area. To overcome this problem, NRTK (VRS) calculates correction data of a virtual reference station using correction data of actual reference stations to interpolate between the actual reference stations. A VRS server performs the individual task of calculating NRTK correction data for each user device based on the approximate location information of each user constantly transmitted from each user device (rover), and then provides corresponding correction data back to each user device.

SUMMARY OF THE INVENTION

NRTK (VRS method) requires user devices to constantly transmit their approximate location information to a server and the server to calculate NRTK correction data for each user device. Since the server constantly calculates correction data for each user device's location, the computation cost of the server increases significantly as the number of user devices increases. Correction data delay or service interruption due to insufficient server capacity may be fatal to real-time precise positioning. Therefore, there is a need for a more stable and inexpensive precise positioning method.

To solve the problem mentioned above, a service area is regularly divided into a certain number of virtual cells, virtual RTK reference stations are placed in the virtual cells, and correction data for the virtual RTK reference stations are collectively calculated by interpolating correction data of actual RTK reference stations inside and/or outside the service area. By organizing correction data of actual and/or virtual RTK reference stations located in any combination of the virtual cells for one timeslot, a virtual cell RTK frame is generated and then distributed to local servers or provided to a user device through networks, which relieves the server cost of calculating correction data for each user device. In addition, by introducing the concept of a virtual cell map, it is possible to generate a virtual cell RTK frame in which correction data of the RTK reference station can be spatially and temporally differentiated by adjusting the combination, number, spatial density, and/or correction data transmission period of required RTK reference stations. Hence, RTK reference stations can be differentiated adaptively based on the real-time feedback on traffic volume, etc. measured in each virtual cell.

The present invention configured as described above can increase the level of optimization of correction data and further achieve cost-effectiveness of distribution or provision of correction data through a network.

Precise positioning enhanced by virtual cell maps in high-traffic or accident-prone areas will improve traffic flow and reduce traffic accidents. Also, where the average speed of vehicles is high, such as on highways, correction data can be distributed or provided more frequently so that drivers do not miss highway exits.

Furthermore, if virtual cell RTK frames are supplied to application servers of positioning service providers, the present invention can be the basis for an Internet-based low-cost, high quality positioning service that can be used for drone delivery or augmented reality.

The accompanying drawings are exemplified by reference for understanding the technical idea of the present invention, and the scope of the present invention is not limited thereto.

DETAILED DESCRIPTION OF THE INVENTION

Specific structural or functional descriptions of the embodiments disclosed in the specification or application of the present invention are for illustrative purpose only and do not limit the present invention. Descriptions of technical contents that are well known in the technical field to which the present invention pertains and are not directly related to the present invention will be omitted.

Figure 1:
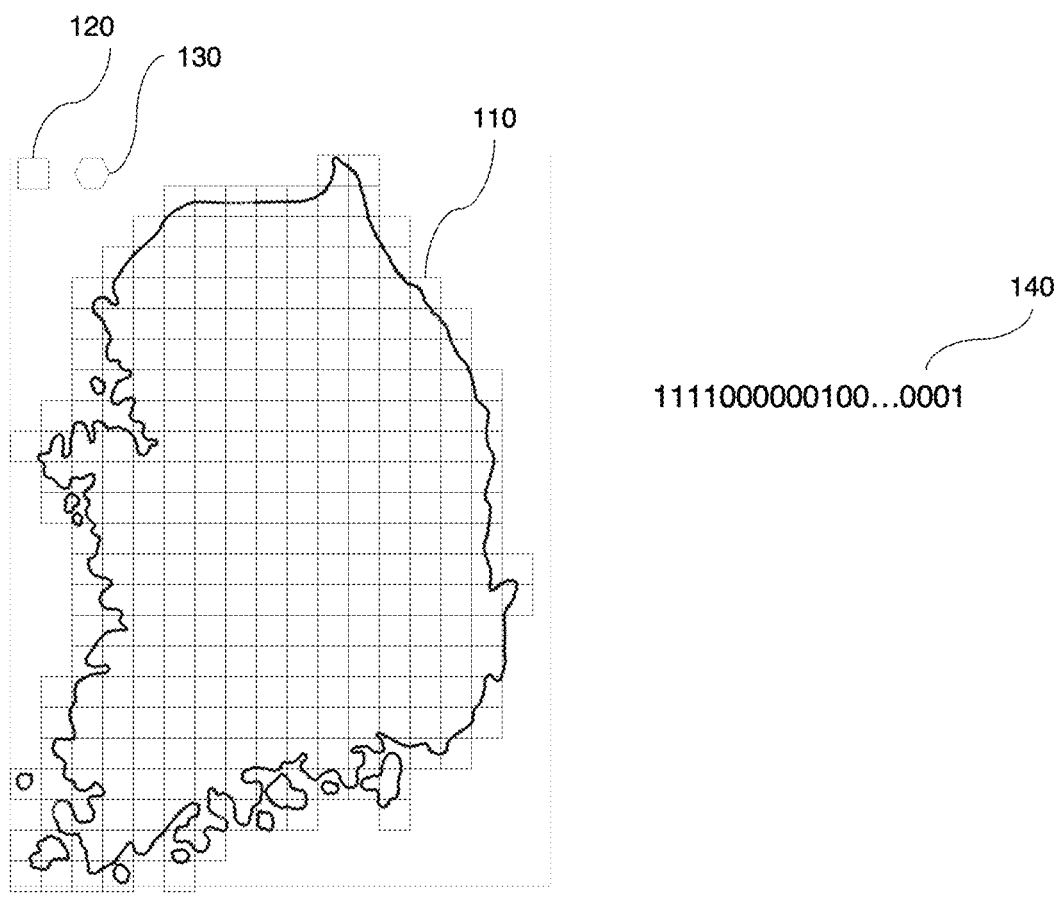
FIG. 1 is a conceptual diagram illustrating a virtual cell division of a service area and a virtual cell map.

FIG. 1 is a conceptual diagram illustrating a virtual cell division of a service area and a virtual cell map.

If the service area is regularly divided into virtual cells of a certain shape, it is easy to find a way to put the virtual cells in a sequence, and any virtual cells within the service area can be identified only by their index of the sequence.

The shape of a virtual cell can be a square 120, a hexagon 130, and so on, and the service area can be regularly divided into virtual cells of one shape. In some cases, more than one shape can be chosen to divide the service area. In FIG. 1, most basic form of cell division into square virtual cells is shown 110. It is recommended to keep a distance between the RTK base station and the user device (rover) within 10 km for measurement models that does not utilize precise ephemeris. Therefore, a simple structure that divides the service area into square virtual cells with a side of 20 km will be generally good.

After the service area is regularly divided into the virtual cells of a certain shape, all of the virtual cell are arranged in a sequence in some ways. There can be many different ways to arrange the virtual cells in order. Basically, there is a matrix sequence, starting with the northernmost row of the set of the virtual cells, moving from the westernmost to the easternmost in each row, moving to the southernmost row.

Hence, if each virtual RTK reference station is placed at a predefined relative position inside a virtual cell, location of each virtual RTK reference station is easily calculated using only its index of the virtual cell sequence. Consequently, the cost of communication, i.e., transmitting absolute locations of RTK reference stations to user devices, can be eliminated.

In designing a virtual cell structure, a hierarchical virtual cell structure can be introduced for some areas with narrow lanes or high traffic. Hierarchical design of virtual cells by recursively dividing the service area can provide more precise and advanced positioning services. However, it is not easy to find a clear way to create a sequence of reference stations under a hierarchical structure. This is one of the reasons why sequences of virtual cells are preferred over sequences of reference stations.

Virtual RTK reference stations are not actually (physically) installed, so they can be located on the surface of the sea or in the air. This feature enables the design of a virtual cell structure that can accurately locate ships and travelers on the sea, and facilitates high-quality positioning services for airplanes, helicopters and unmanned aerial vehicles such as drones.

The time axis is divided into timeslots, and correction data of RTK reference stations in some virtual cells and other necessary information (satellite ephemeris, etc.) are organized to encode a virtual cell RTK frame for each timeslot. Correction data of an RTK reference station can refer to raw measurement data (i.e., observables) or observation errors.

The introduction of the virtual cell map here allows correction data of RTK reference stations in any combination of virtual cells to be loaded into the virtual cell RTK frame for each timeslot without wasting any bits for virtual cell IDs or indices. Therefore, only virtual cells that meet certain criteria can be selected and inserted into the virtual cell RTK frame. As a result, the virtual cell map can reduce network costs, and further refine correction data by narrowing timeslots.

As an embodiment of the present invention, the virtual cell map 140 of FIG. 1 shows binary codes "1" or "0" as many as the number of the virtual cells, and binary code "1" indicates that a corresponding virtual cell in a virtual cell sequence is valid, and binary code "0" indicates that a corresponding virtual cell in a virtual cell sequence is invalid. Correction data of RTK reference stations in invalid virtual cells do not present in the virtual cell RTK frame. In the virtual cell frame, the virtual cell map and correction data of RTK reference stations in valid virtual cells (indicated as "1" in the virtual cell map) are arranged in the order of the virtual cell sequence. And if necessary, other information such as satellite orbital data can be attached. Under a policy of selecting all the virtual cells, the virtual cell map is not required and can be omitted.

A virtual cell RTK frame decoder 240 refers to the virtual cell map and inputs correction data of each RTK reference station into corresponding records in a virtual cell table 243 in the order of the virtual cell sequence, except records corresponding to virtual cells that are not valid according to the virtual cell map. The virtual cell table 243 can be updated in whole or in part with latest correction data.

The virtual cell RTK frame decoder 240 can optionally output a copy of the virtual cell table for application servers or user devices.

Figure 2:
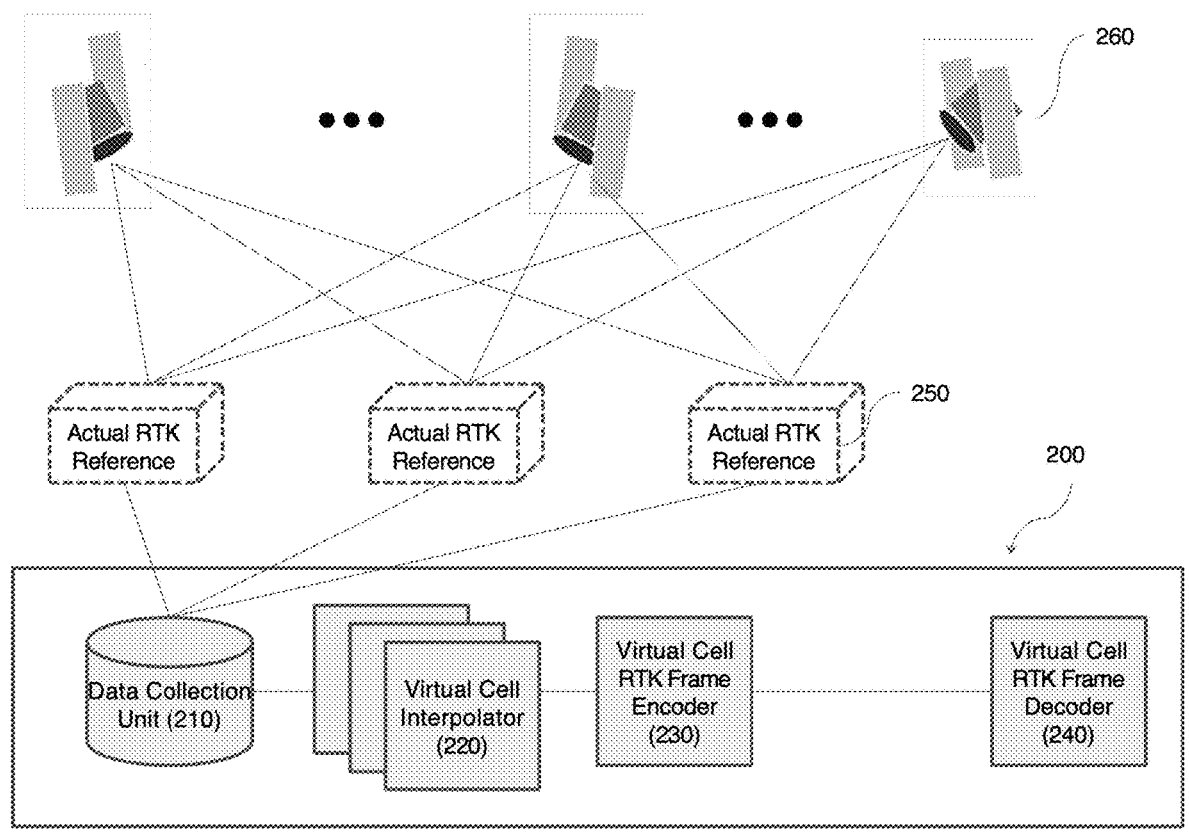
FIG. 2 is a conceptual diagram schematically illustrating a virtual cell RTK system.

FIG. 2 is a conceptual diagram schematically illustrating a virtual cell RTK system.

As shown in FIG. 2, the virtual cell RTK system 200 includes a data collection unit 210 which collects correction data from a plurality of actual RTK reference stations 250 which receive the GNSS navigation satellite 260 signals to generate and supply correction data, a virtual cell interpolation unit 220 which receives correction data of actual RTK reference stations from the data collection unit 210 and interpolates correction data for virtual RTK reference stations, a virtual cell RTK frame encoder 230 which encodes the virtual cell RTK frame by receiving correction data of RTK reference stations in virtual cells from the virtual cell interpolation unit 220 and organizing correction data of one or more RTK reference stations for each timeslot and the virtual cell RTK frame decoder 240 which decodes the virtual cell RTK frame to obtain latest correction data of RTK reference stations.

The GNSS navigation satellite 260 includes the United State's Global Positioning System (GPS), the European Union's Galileo, Russia's Navigation Satellite System (GLONASS), and/or China's BeiDou Navigation Satellite System (BDS).

Figure 3:
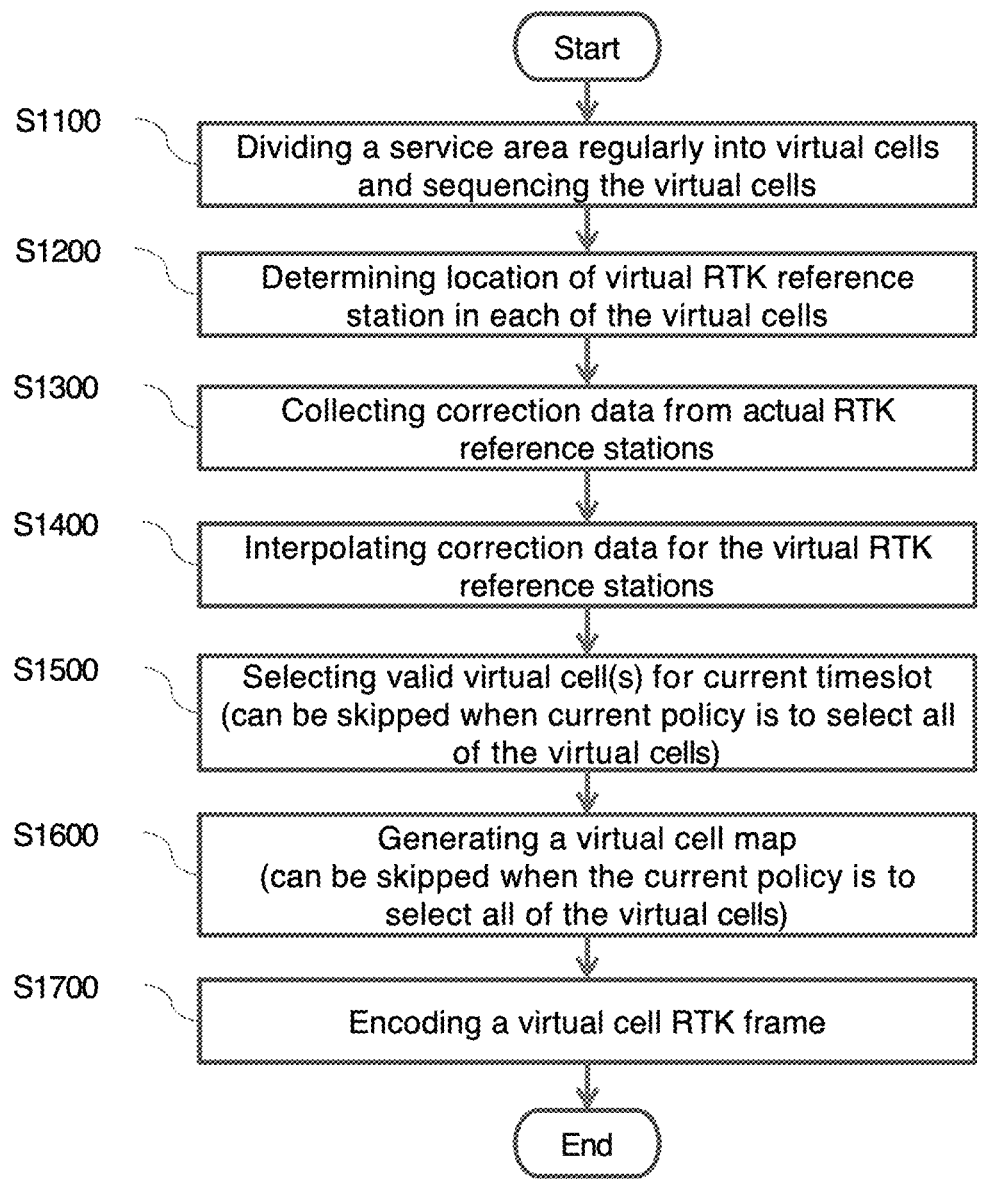
FIG. 3 is a flowchart illustrating a procedure for encoding a virtual cell RTK frame.

FIG. 3 is a flowchart illustrating a procedure for encoding the virtual cell RTK frame.

S1100 functions to get the service area regularly divided into the virtual cells of a certain shape and put the virtual cells in a sequence. In such a virtual cell structure, a virtual cell can be identified only by sequence index of the virtual cell.

S1200 functions to determine the location of a virtual RTK reference station in each of the virtual cells in a predefined way. Simply, virtual RTK reference station can be placed at the center of each of the virtual cells. Since sequence index of a virtual cell can identify a virtual cell, the absolute position of a virtual RTK reference station in a virtual cell can also be easily calculated. Hence, the location information of each virtual RTK reference station are not contained in the virtual cell RTK frame, but the virtual cell RTK frame decoder 240 can calculate the location directly using sequence index of each virtual cell.

In S1300, the data collection unit 210 collects correction data of actual RTK reference stations inside and, additionally or alternatively, outside the service area. The data collection unit 210 can tabulate and organize collected correction data of each actual RTK reference station.

In S1400, the virtual cell interpolation unit 220 can calculate interpolated correction data for virtual RTK reference stations located in each of the virtual cells using correction data of actual RTK reference stations collected by the data collection unit 210. The calculation of interpolated correction data for virtual RTK reference stations can be performed using geometric relationship between the trajectory of the navigation satellites 260 and the positions of the actual RTK reference stations 250, or in any other ways by commercial software.

S1500 functions to select virtual cells to be transmitted in current timeslot according to predefined criteria when current policy is not to select all of the virtual cells.

S1600 functions to generate the virtual cell map indicating valid (selected) virtual cells for the current timeslot, but when the current policy is to select all of the virtual cells, this step of generating the virtual cell map can be skipped.

S1700 functions to encode the virtual cell RTK frame by organizing the virtual cell map and correction data of real and/or virtual RTK reference stations in the valid (selected) virtual cells, but when the current policy is to select all the virtual cells, the virtual cell map has no useful information and can be excluded from the virtual cell RTK frame.

Figure 4:
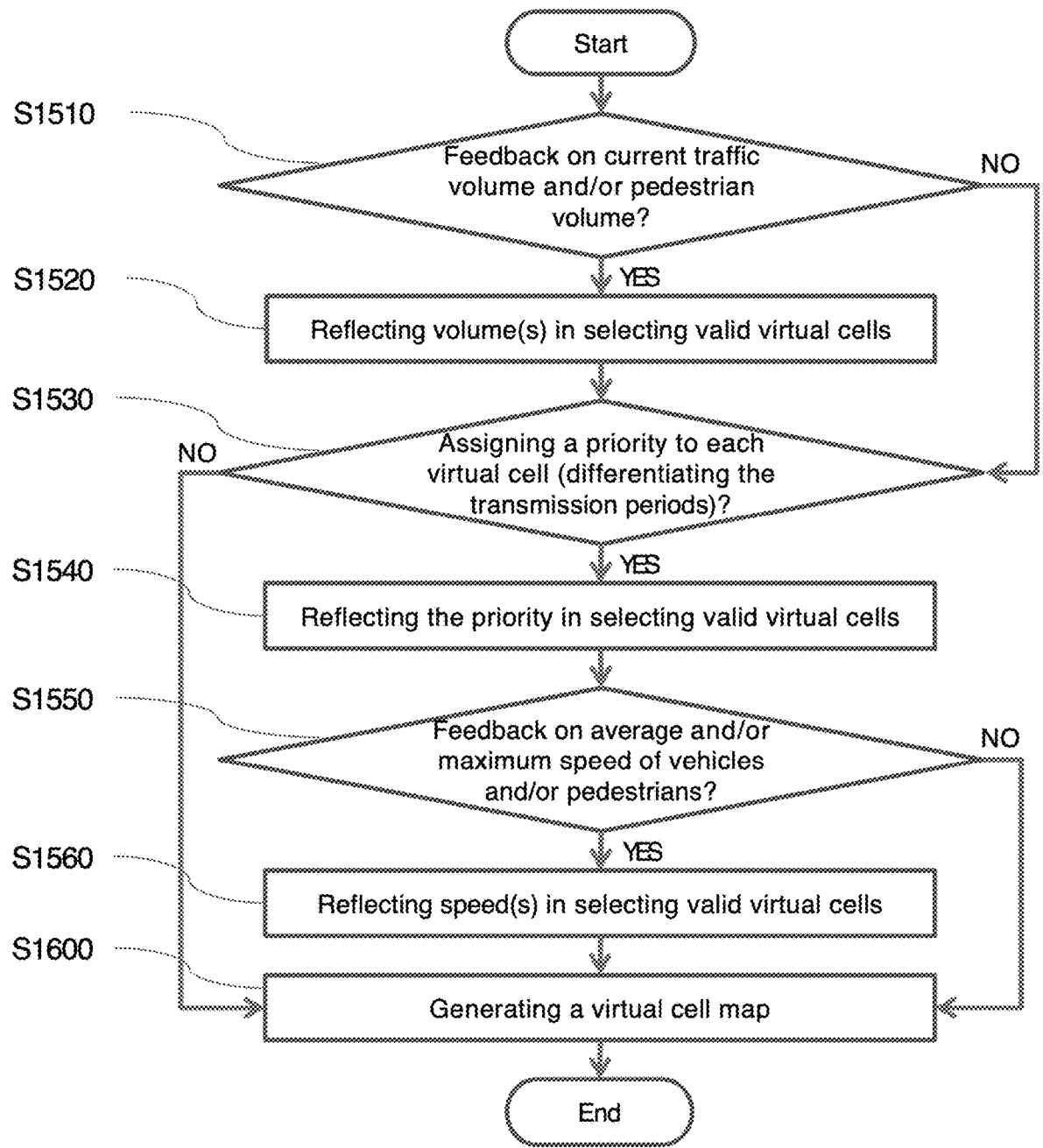
FIG. 4 is a flowchart illustrating a detailed procedure for performing differentiation or adaptive differentiation while the virtual cell RTK frame is generated.

FIG. 4 is a flowchart illustrating a detailed procedure for performing differentiation or adaptive differentiation while the virtual cell RTK frame is generated.

In S1510, the virtual cell RTK frame encoder 230 may receive feedback on current traffic volume and/or pedestrian volume measured in each virtual cell in real time.

In S1520, the virtual cell RTK frame encoder 230 can determine spatial density ranking of a virtual cell in the service area according to the feedback in S1510, and can reflect the spatial density ranking in the selection of the valid virtual cells.

When the virtual cell RTK frame encoder 230 creates the virtual cell map by performing a procedure for determining validity of each virtual cell for each timeslot, S1530 functions to assign a priority for temporal density to each virtual cell to differentiate the transmission periods of correction data of each RTK reference station in the virtual cells.

S1540 functions to determine the timeslot distribution of each virtual cell based on the differentiated transmission periods in S1530 and each timeslot distribution can be reflected in the selection procedure of the valid virtual cells for each timeslot.

In S1550, the virtual cell RTK frame encoder 230 may receive feedback on average and/or maximum speeds of vehicles and/or pedestrians measured in each virtual cell in real time.

S1560 functions to calculate adaptive transmission period of correction data of each RTK reference station according to the feedback in S1550, and then determine the adaptive timeslot distribution of each virtual cell based on the adaptive transmission period. Hence, each adaptive timeslot distribution can be reflected in the selection procedure of the valid virtual cells for each timeslot.

S1600 functions to generate the virtual cell map for the virtual cell RTK frame based on the adaptive spatial (i.e. intra-frame) density differentiation in S1520, the temporal (i.e. inter-frame) density differentiation in S1540, and/or the adaptive temporal (i.e. inter-frame) density differentiation in S1560.

Figure 5:
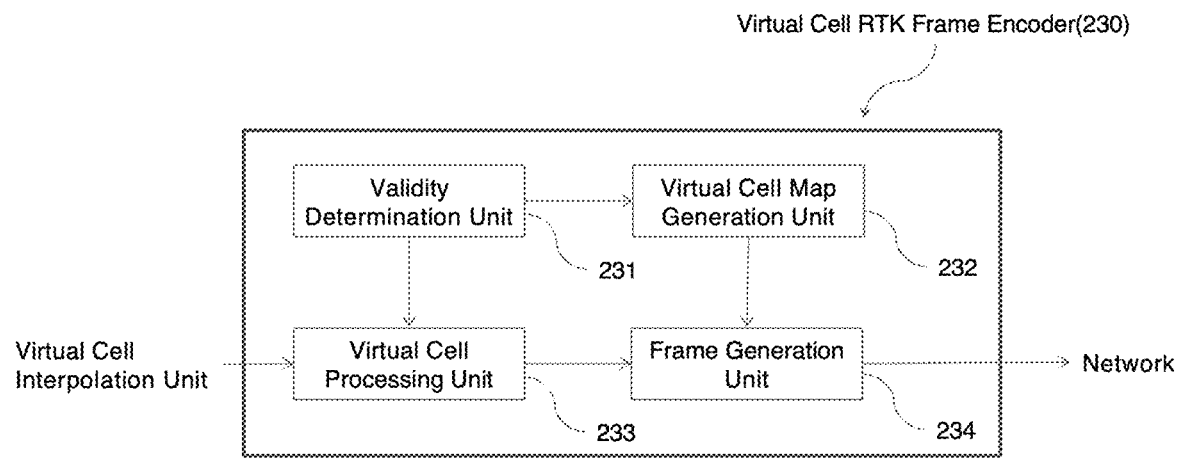
FIG. 5 is an internal block diagram of a virtual cell RTK frame encoder.

FIG. 5 is an internal block diagram of the virtual cell RTK frame encoder.

The virtual cell RTK frame encoder 230 includes a validity determination unit 231 which determines and outputs validity of each virtual cell according to predefined criteria, a virtual cell map generation unit 232 which generates the virtual cell map indicating the valid virtual cells according to the determination from the validity determination unit 231, a virtual cell processing unit 233 which receives correction data of RTK reference stations in each virtual cell and outputs correction data of RTK reference stations in the valid virtual cells according to the determination from the validity determination unit 231, and a frame generation unit 234 for generating the virtual cell RTK frame by organizing the virtual cell map and correction data of RTK reference stations of the valid virtual cells.

Figure 6:
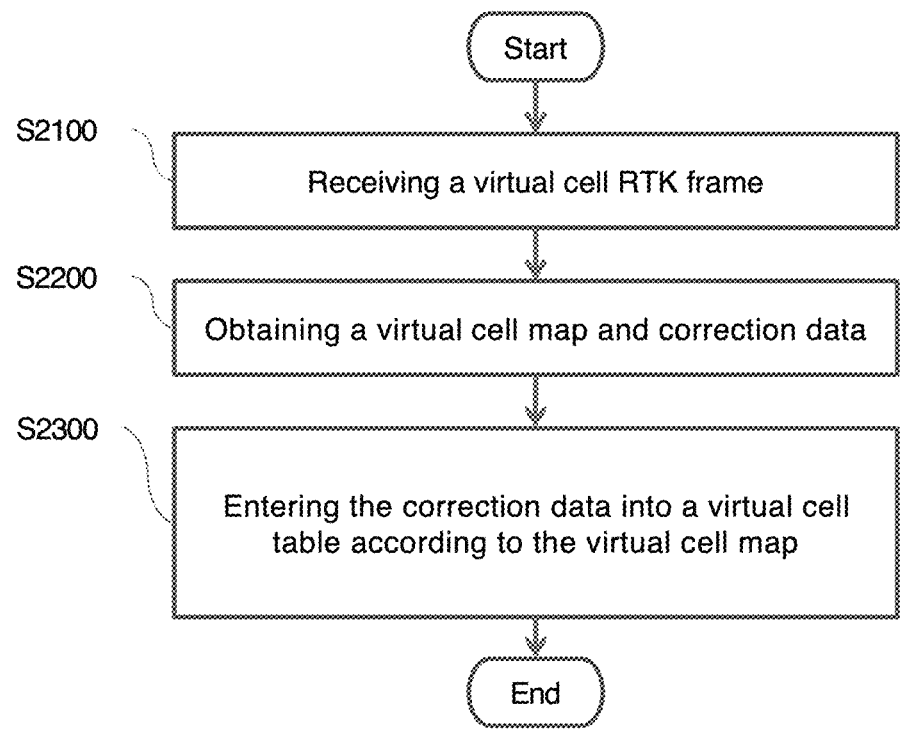
FIG. 6 is a flowchart illustrating a procedure for decoding the virtual cell RTK frame.

FIG. 6 is a flowchart illustrating a procedure for decoding the virtual cell RTK frame.

In S2100, the virtual cell RTK frame decoder 240 receives the virtual cell RTK frame through networks.

And then, S2200 functions to obtain the virtual cell map and correction data of the RTK reference stations in the valid virtual cells from the received virtual cell RTK frame.

S2300 functions to update the virtual cell table 243 by entering correction data of RTK reference stations in the order of the virtual cell sequence into corresponding records, except records corresponding to virtual cells that are not valid according to the virtual cell map.

Figure 7:
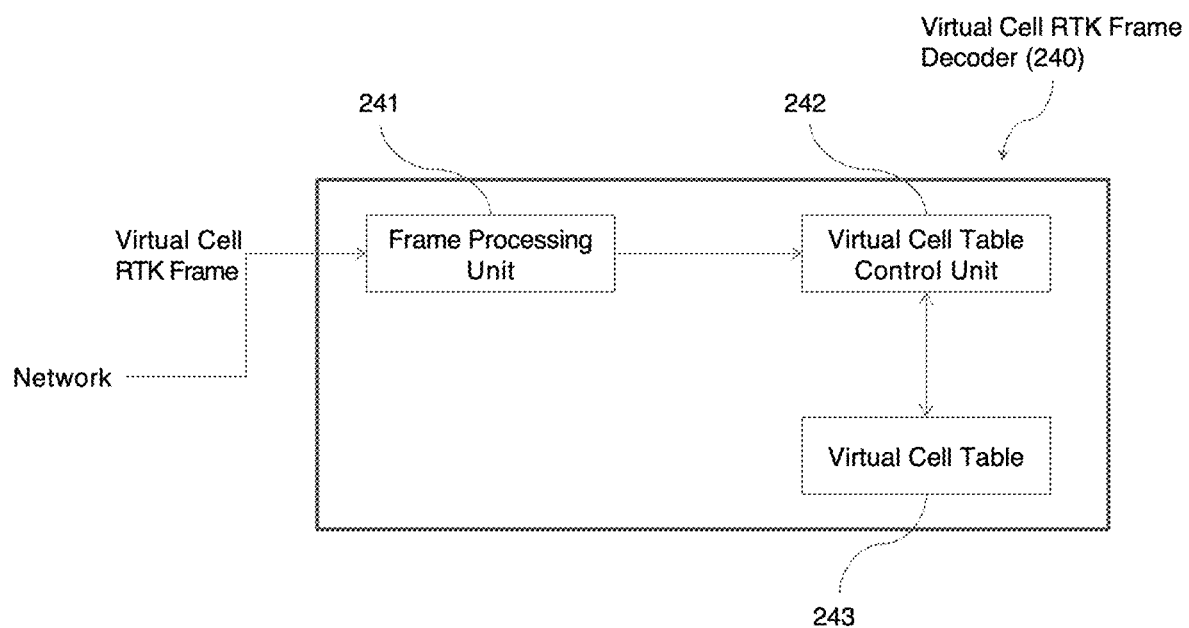
FIG. 7 is an internal block diagram of a virtual cell RTK frame decoder.

FIG. 7 is an internal block diagram of the virtual cell RTK frame decoder.

The virtual cell RTK frame decoder 240 includes a frame processing unit 241 which receives and disassembles the virtual cell RTK frame to obtain the virtual cell map and correction data of valid RTK reference stations, a virtual cell table control unit 242 which updates the virtual cell table 243 by entering correction data of each valid RTK reference station into corresponding records in the order of the virtual cell sequence, except records corresponding to virtual cells that are not valid according to the virtual cell map, and the virtual cell table 243 which has records corresponding to every virtual cell, wherein a record stores correction data of an RTK reference station in a corresponding virtual cell.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method for distributing or providing correction data of RTK (Real Time Kinematic) reference stations, the method comprising:
   dividing a service area into virtual cells regularly and sequencing the virtual cells;
   determining location of a virtual RTK reference station in each of the virtual cells;
   collecting correction data from actual RTK reference stations located inside and/or outside the service area;
   calculating interpolated correction data for each virtual RTK reference station using correction data from actual RTK reference stations;
   selecting one or more valid virtual cells for current timeslot when current policy is not to select all of the virtual cells;
   generating a virtual cell map indicating the valid virtual cells for the current timeslot when the current policy is not to select all of the virtual cells; and
   encoding a virtual cell RTK frame for the current timeslot by organizing the virtual cell map and correction data of RTK reference stations in the valid virtual cells when the current policy is not to select all of the virtual cells, or by organizing correction data of RTK reference stations in the virtual cells when the current policy is to select all of the virtual cells.

2. The method of claim 1, wherein encoding the virtual cell RTK frame comprises encoding the virtual cell RTK frame excluding correction data of the actual RTK reference stations.

3. The method of claim 1, wherein selecting one or more valid virtual cells comprises selecting one or more valid virtual cells adaptively in consideration of spatial densities derived from real-time information including traffic volume and/or pedestrian volume in each of the virtual cells.

4. The method of claim 1, wherein selecting one or more valid virtual cells comprises selecting one or more valid virtual cells based on differentiation of transmission periods of correction data of the RTK reference stations in the virtual cells.

5. The method of claim 4, wherein differentiation of transmission periods is adaptively performed in consideration of temporal densities derived from real-time information such as average and/or maximum speed of vehicles and/or pedestrians in each of the virtual cells.

6. A method for receiving and processing a virtual cell RTK (Real Time Kinematic) frame, the method comprising:
   receiving the virtual cell RTK frame;
   obtaining a virtual cell map and correction data of RTK reference stations from the virtual cell RTK frame; and
   updating a virtual cell table by entering correction data of the RTK reference stations from the virtual cell RTK frame into corresponding records in the virtual cell table in order of virtual cell sequence, except records corresponding to virtual cells that are not valid according to the virtual cell map.

7. The method of claim 6, further comprising outputting a copy of the virtual cell table.

8. A virtual cell RTK (Real Time Kinematic) system comprising:
   a data collection unit configured to collect correction data from actual RTK reference stations located inside and/or or outside a service area;
   a virtual cell interpolation unit configured to receive correction data from the data collection unit and calculate interpolated correction data for virtual RTK reference stations using correction data received;

a virtual cell RTK frame encoder configured to receive correction data of the RTK reference station(s) from the virtual cell interpolation unit, organize correction data of RTK reference station(s) in one or more valid virtual cells, and encode a virtual cell RTK frame; and a virtual cell RTK frame decoder configured to receive the virtual cell RTK frame through networks, obtain correction data of the RTK reference station(s) in the valid virtual cells, and update a virtual cell table in whole or in part.

9. A virtual cell RTK (Real Time Kinematic) frame encoder comprising:

a validity determination unit configured to determine validity of each of virtual cells according to predefined criteria;

a virtual cell processing unit configured to receive correction data of RTK reference stations in the virtual cells and generate correction data of RTK reference station(s) in valid virtual cell(s) according to the determinations from the validity determination unit;

a virtual cell map generation unit configured to generate a virtual cell map indicating the valid virtual cell(s) according to the determinations from the validity determination unit; and a frame generation unit configured to generate a virtual cell RTK frame by organizing the virtual cell map from the virtual cell map generation unit and correction data from the virtual cell processing unit.

10. A virtual cell RTK (Real Time Kinematic) frame decoder comprising:

a frame processing unit configured to receive and disassemble a virtual cell RTK frame from networks and obtain a virtual cell map and correction data of RTK reference station(s) in valid virtual cell(s);

a virtual cell table having records corresponding to every virtual cell, wherein a record stores correction data of an RTK reference station in a corresponding virtual cell; and a virtual cell table control unit configured to enter correction data from the frame processing unit into corresponding records in the virtual cell table in order of virtual cell sequence, except records corresponding to virtual cells that are not valid according to the virtual cell map.

* * * * *